(12) United States Patent
Böhnke

(10) Patent No.: US 9,968,871 B2
(45) Date of Patent: May 15, 2018

(54) FILTER DEVICE AND METHOD FOR FILTERING A SUSPENSION

(75) Inventor: Bernd Böhnke, Eschweiler (DE)

(73) Assignee: OUTOTEC (FINLAND) OY, Espoo (FI)

( * ) Notice: Subject to any disclaimer, the term of this patent is extended or adjusted under 35 U.S.C. 154(b) by 182 days.

(21) Appl. No.: 14/394,490

(22) PCT Filed: Apr. 19, 2012

(86) PCT No.: PCT/EP2012/057204
§ 371 (c)(1),
(2), (4) Date: Oct. 15, 2014

(87) PCT Pub. No.: WO2013/156073
PCT Pub. Date: Oct. 24, 2013

(65) Prior Publication Data
US 2015/0068986 A1 Mar. 12, 2015

(51) Int. Cl.
*B01D 25/30* (2006.01)
*B01D 25/12* (2006.01)
(Continued)

(52) U.S. Cl.
CPC ........... *B01D 25/12* (2013.01); *B01D 25/164* (2013.01); *B01D 25/215* (2013.01);
(Continued)

(58) Field of Classification Search
None
See application file for complete search history.

(56) References Cited

U.S. PATENT DOCUMENTS 1,342,839 A 6/1920 Atkins
3,669,267 A * 6/1972 Hutton ................ B01D 25/176
210/231
(Continued)

FOREIGN PATENT DOCUMENTS

EP 2 002 873 A1 12/2008
FR 792 928 A 1/1936
(Continued)

OTHER PUBLICATIONS

EP2002873(A1) published Dec. 17, 2008 bibliographic data and English language abstract, http://worldwide.espacenet.com, 1 pg.

*Primary Examiner* — Thomas M Lithgow
(74) *Attorney, Agent, or Firm* — Von Rohrscheldt Patents

(57) ABSTRACT

The invention relates to a filter device for filtering a suspension, and the method of operation thereof, wherein between a stationary head piece and a movable end piece, the filter device has a pack of a recess plate and an adjacent recess plate, the filter device has a suspension pipe for piping for piping a first stream of the suspension from the head piece into the pack, wherein connecting to the end piece, and a supply pipe for piping a second stream of the suspension into the suspension pipe, forming a filter chamber, the recess plate and/or the adjacent recess plate has a recess, from the suspension pipe, the recess plate has a suspension duct for piping the suspension into the filter chamber, and wherein between the recess plate and the adjacent recess plate, the filter device has at least one filter cloth for filtering a solid content out of the suspension.

11 Claims, 2 Drawing Sheets

(51) Int. Cl.
- *B01D 35/30* (2006.01)
- *B01D 37/00* (2006.01)
- *B01D 39/08* (2006.01)
- *B01D 25/164* (2006.01)
- *B01D 25/21* (2006.01)

(52) U.S. Cl.
CPC .......... *B01D 25/302* (2013.01); *B01D 35/30* (2013.01); *B01D 37/00* (2013.01); *B01D 39/08* (2013.01)

(56) References Cited

U.S. PATENT DOCUMENTS

| | | | |
|---|---|---|---|
| 5,658,468 A | 8/1997 | Tigel Gil et al. | |
| 6,491,817 B1 | 12/2002 | Benesi | |

FOREIGN PATENT DOCUMENTS

| | | | |
|---|---|---|---|
| JP | 57094312 A | 6/1982 | |
| JP | 04033907 U | 7/1992 | |
| JP | 06134216 A | 5/1994 | |
| JP | 08010517 A | 1/1996 | |
| WO | 2005/007266 A1 | 1/2005 | |
| WO | WO2005007266 A1 | 1/2005 | |

* cited by examiner

FILTER DEVICE AND METHOD FOR FILTERING A SUSPENSION

SEQUENCE LISTING

Not Applicable

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The invention relates in general to filtering and in particular to a filter device for filtering a suspension and a method for filtering a suspension in a filter device.

(2) Description of Related Art including information disclosed under 37 CFR 1.97 and 1.98

In a known configuration, a press filter device comprises a stationary head piece, a movable end piece, and a pack of recess plates disposed between the head piece and the end piece. A filter chamber is formed between adjacent recess plates by a recess of at least one of a pair of adjacent recess plates. The filter device further comprises a suspension pipe for introducing suspension into the filter chambers of the device, wherein the suspension pipe runs from the head piece to the end piece through the pack. Moreover, the filter device is provided with a supply pipe communicating with the end piece and providing a suspension stream to the suspension pipe. In the known filter devices, the supply pipes to the end piece are flexible hoses or pipes with elbow joints, running parallel to the pack. When opening and closing the pack, one end of the supply pipe moves together with the end piece, whereas the other end remains connected to a fixed suspension source. A flexible supply pipe allows movements of the end piece, but the flexible supply pipe needs to be stiff enough for piping a high-pressure suspension from the suspension source to the end piece. This high stiffness of the supply pipe always causes a torsional moment when moving the end piece.

Furthermore, flexible supply pipes increase the risk of leakage of the known filter devices. Due to safety reasons, use of the known filter devices is thus deprecated for filtering hazardous suspensions.

Furthermore in some filter devices, the suspension pipe runs through the pack outside the filter chamber, causing excentric pressure load of up to several tons to the end piece during the filtration cycle. Stiffness of the supply pipe and pressure load from the suspension pipe easily cause misalignment and deflection of the end piece, and of the recess plates of the pack.

Problem to be Solved

Thus it is an object of the invention to avoid the drawbacks of the state of the art.

BRIEF SUMMARY OF THE INVENTION

The invention suggests a filter device for filtering a suspension, wherein between a stationary head piece and a movable end piece, the filter device has a pack of at least a recess plate and an adjacent recess plate, wherein running to the end piece through the pack, including through the recess plate and the adjacent recess plate, the filter device has a suspension pipe for piping a first stream of the suspension from the head piece into the pack, wherein connecting to the end piece, the filter device has a supply pipe for piping a second stream of the suspension into the suspension pipe, wherein forming a filter chamber between the recess plate and the adjacent recess plate, the recess plate and/or the adjacent recess plate has a recess, wherein from the suspension pipe, the recess plate has a suspension duct for piping the suspension into the filter chamber, and wherein between the recess plate and the adjacent recess plate, the filter device has at least one filter cloth for filtering a solid content out of the suspension, wherein the supply pipe runs from the head piece to the end piece through the pack, including through the recess plate and the adjacent recess plate. A filter device according to the invention avoids the need for a flexible supply pipe, and thus the torsional moment induced when moving the end piece.

Preferably, in a filter device according to the invention the suspension pipe and the supply pipe are on opposite sides of the filter device, and of both the recess plate and the adjacent recess plate. In such a filter device, loaded with the suspension on equal pressure, both the suspension pipe and the supply pipe cause individually excentric, but together balanced pressure load to the end piece.

Further preferred, in a filter device according to the invention the supply pipe has the same sectional area as the suspension pipe. If supplied with equal pressure to the same sectional area, theoretically equal streams of the suspension are induced into both the suspension pipe and the supply pipe.

In an advantageous specification, a filter device according to the invention has a duct, that is integrated into the end plate, and that connects the supply pipe to the suspension pipe. Such a filter device avoids the need for an external pipe from the supply pipe to the suspension pipe.

In a filter device according to the invention, the recess plates of the pack are vertically stacked on top of each other or hanging side by side. The filter device is secured by hydraulic force, by the weight of the stacked recess plates and/or by mechanical means. Each filter chamber is equipped with at least one filter cloth, but may be equipped with two filter cloth, where in the first case the suspension is piped into the recess of one recess plate and permeating the filter cloth to the other, and in the latter case filled in between the filter cloths and permeating to both adjacent recess plates. In a filter device according to the invention, recesses may have movable membranes, the membranes and the respective recesses enclosing a squeezing chamber, that may be loaded with a squeezing fluid for mechanically pressing the remaining solid (the "filter cake"). The recess plates of a filter device according to the invention are made of plastics, e.g. polypropylene (PP), or of metal, e.g. aluminium or steel.

The invention further suggests a method for filtering a suspension in a filter device, wherein between a stationary head piece and a movable end piece, the filter device has a pack of at least a recess plate and an adjacent recess plate, and wherein the recess plate and/or the adjacent recess plate has a recess, forming a filter chamber between the recess plate and the adjacent recess plate, the method including the steps of piping a first stream of the suspension from the head piece running through a suspension pipe, that runs from the head piece to the end piece through the pack, including through both the recess plate and the adjacent recess plate, piping a second stream of the suspension from a supply pipe through the end piece into the suspension pipe, piping the suspension from the suspension pipe through a suspension duct of the recess plate into the filter chamber, and directing the suspension through at least one filter cloth between the recess plate and the adjacent recess plate, filtering a solid content out of the suspension, wherein the supply pipe runs from the head piece to the end piece through the pack, including through the recess plate and the adjacent recess plate. The method according to the invention is executed on a filter device described supra and features the same advantages.

DETAILED DESCRIPTION OF THE INVENTION

Figure 1:
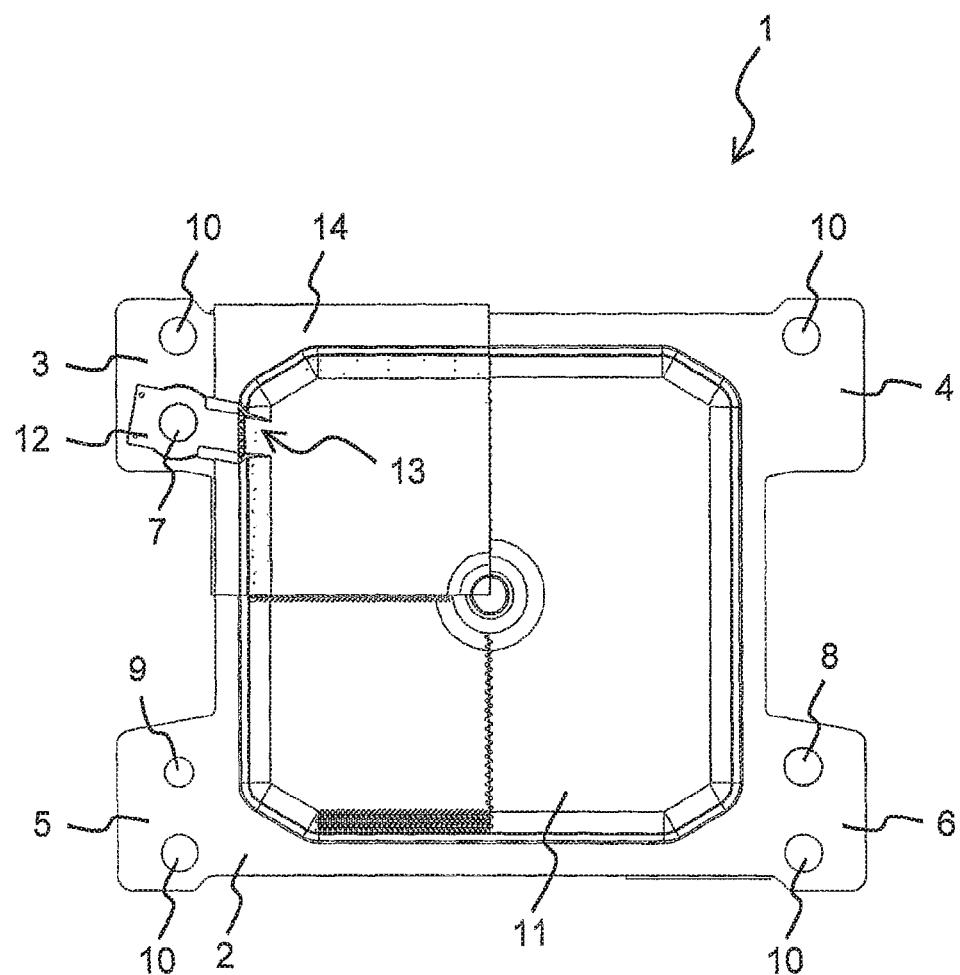
FIG. 1 is an exemplary embodiment of the invention.
Figure 2:
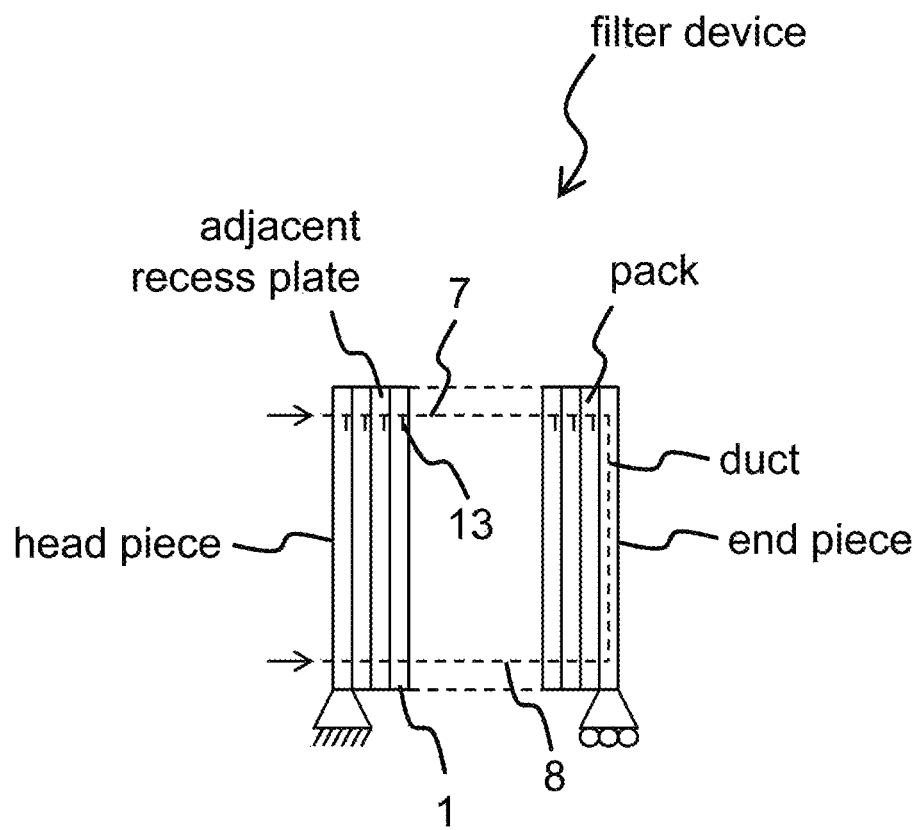
FIG. 2 is another exemplary embodiment of the invention.

The method according to the invention and the associated device are subsequently described in more detail with reference to a preferred embodiment illustrated in the drawing figure.

The figure shows a recess plate 1 of a filter device according to the invention. The filter device is a membrane filter press with vertically disposed recess plates 1. The filter device has a stationary head piece and a movable end piece, and a pack of hundred specimens of the recess plate 1 between the head piece and the end piece. Apart from the recess plate 1, the filter device and its further components are not shown.

The recess plate 1 has a substantially square base body 2, two load bearing extensions 3, 4 are applied to the base body 2 on top and two non-load bearing extensions 5, 6 at the bottom. A suspension pipe 7 runs through the extension 3 on the top left and a supply pipe 8 through the extension 6 on the bottom right. The suspension pipe 7 and the supply pipe 8 both have diameters of 100 mm. The end plate has an integrated duct, that connects the supply pipe 8 to the suspension pipe 7.

In the recess plate 1, a pressure medium channel 9 runs through the extension 5 on the bottom left. Filtrate channels 10 run through each of the extensions 3, 4, 5, 6. The filtrate channels 10, the suspension pipe 7, the supply pipe 8 and the pressure medium channel 9 extend transversally to the recess plate 1 through the filter device.

On the chamber side shown in the figure, and on the membrane side (not shown), the recess plate 1 has lens shaped recesses 11, which together form a filter chamber in assembled state of the filter device, between adjacent recess plates 1. Apart from the recess 11, the filter chamber is not shown. A filling shoe 12 with suspension ducts 13 connects the suspension pipe 7 to the recess 11. Two filter cloths 14 (only one of them is shown) are disposed between adjacent recess plates 1 and extend in parallel thereto.

During filtration, a first stream of the suspension is piped into the suspension pipe 7 and a second stream of the suspension into the supply pipe 8, both at a pressure of up to 10 bar. From the suspension pipe 7, the suspension is piped into the filter chamber through the filling shoe 12 between the filter cloths 14. A solid content from the suspension settles on the filter cloths 14 as a filter cake, and a remaining liquid fraction of the suspension permeates the filter cloths 14 as a filtrate into the recesses 11 and is discharged through outlets (not shown) into the filtrate channels 10.

In another filter device according to the invention, the recess plates are basically similar to the recess plate 1 shown in the figure, but have two suspension pipes, diagonally opposed to each other, and two supply pipes, each connected to one of the suspension pipes. The other filter device and its recess plates are not shown.

IN THE FIGURES 1 recess plate
2 base body
3 extension
4 extension
5 extension
6 extension
7 suspension pipe
8 supply pipe
9 pressure medium channel
10 filtrate channel
11 recess
12 filling shoe
13 suspension duct
14 filter cloth

SEQUENCE LISTING

Not Applicable

What is claimed is:
1. Filter device for filtering a suspension, wherein
 a. between a stationary head piece and a movable end piece, the filter device has a pack of at least a recess plate and an adjacent recess plate,
 b. running to the end piece through the pack, including through the recess plate and the adjacent recess plate, the filter device has a suspension pipe for piping a first stream of the suspension from the head piece into the pack,
 c. connecting to the end piece, the filter device has a supply pipe for piping a second stream of the suspension into the suspension pipe,
 d. forming a filter chamber between the recess plate and the adjacent recess plate, the recess plate and/or the adjacent recess plate has a recess, e. from the suspension pipe, the recess plate has a suspension duct for piping the suspension into the filter chamber, and f. between the recess plate and the adjacent recess plate, the filter device has at least one filter cloth for filtering a solid content out of the suspension, characterized in that the supply pipe runs from the head piece to the end piece through the pack, including through the recess plate and the adjacent recess plate, and characterized by a duct, that is integrated into the end plate, and that connects the supply pipe to the suspension pipe.

2. Filter device according to claim 1, characterized in that the suspension pipe and the supply pipe are on opposite sides of the filter device, and of both the recess plate and the adjacent recess plate.

3. Filter device according to claim 1, characterized in that the supply pipe has the same sectional area as the suspension pipe.

4. Filter device according to claim 1,
characterized in that the supply pipe is connected to the suspension pipe without an external pipe from the supply pipe to the suspension pipe.

5. Method for filtering a suspension in a filter device, wherein between a stationary head piece and a movable end piece, the filter device has a pack of at least a recess plate and an adjacent recess plate, and wherein the recess plate and/or the adjacent recess plate has a recess, forming a filter chamber between the recess plate and the adjacent recess plate, the method including the steps of a. piping a first stream of the suspension from the head piece running through a suspension pipe, that runs from the head piece to the end piece through the pack, including through both the recess plate and the adjacent recess plate;

b. piping a second stream of the suspension from a supply pipe through the end piece into the suspension pipe, c. piping the suspension from the suspension pipe through a suspension duct of the recess plate into the filter chamber; and d. directing the suspension through at least one filter cloth between the recess plate and the adjacent recess plate, filtering a solid content out of the suspension, characterized in that the supply pipe runs from the head piece to the end piece through the pack, including through the recess plate and the adjacent recess plate, and characterized by a duct, that is integrated into the end piece, and that connects the supply pipe to the suspension pipe.

6. The method of claim 5, characterized in that the supply pipe is connected to the suspension pipe without an external pipe from the supply pipe to the suspension pipe.

7. A filter device for filtering a suspension, comprising:
a pack of at least a recess plate and an adjacent recess plate between a stationary head piece and a movable end piece;

a suspension pipe for receiving a first stream of the suspension from the head piece running to the end piece through the pack including through the recess plate and the adjacent recess plate;

a supply pipe for piping a second stream of the suspension into the suspension pipe connecting to the end piece;

the recess plate or the adjacent recess plate has a recess forming a filter chamber between the recess plate and the adjacent recess plate;

the recess plate has a suspension duct for piping suspension from the first stream of the suspension and the second stream of the suspension into the filter chamber from the suspension pipe; and at least one filter cloth for filtering a solid content out of the suspension between e recess plate and the adjacent recess plate, wherein the supply pipe runs from the head piece to the end piece through the pack, including through the recess plate and the adjacent recess plate, and wherein the supply pipe is connected to the suspension pipe without an external pipe from the supply pipe to the suspension pipe.

8. The filter device according to claim 7, wherein the suspension pipe and the supply pipe are on opposite sides of the filter device, and of both the recess plate and the adjacent recess plate.

9. The filter device according to claim 7, wherein the supply pipe has the same sectional area as the suspension pipe.

10. The filter device according to claim 7, further comprising a duct integrated into the end plate that connects the supply pipe to the suspension pipe.

11. Method for filtering a suspension in a filter device, wherein between a stationary head piece and a movable end piece, the filter device has a pack of at least a recess plate and an adjacent recess plate, and wherein the recess plate or the adjacent recess plate has a recess, forming a filter chamber between the recess plate and the adjacent recess plate, the method comprising the steps of:

piping a first stream of the suspension front the head piece into a suspension pipe that runs from the head piece to the end piece through the pack, including through both the recess plate and the adjacent recess plate;

piping a second stream of the suspension from a supply pipe through the end piece into the suspension pipe;

piping suspension from the first stream of the suspension and the second stream of the suspension from the suspension pipe through a suspension duct of the recess plate into the filter chamber; and directing the suspension through at least one filter cloth between the recess plate and the adjacent recess plate, filtering a solid content out of the suspension, wherein the supply pipe runs from the head piece to the end piece through the pack, including through the recess plate and the adjacent recess plate, and characterized by a duct, that is integrated into the end piece, and that connects the supply pipe to the suspension pipe.

* * * * *